United States Patent [19]
Schick et al.

[11] Patent Number: 6,069,935
[45] Date of Patent: May 30, 2000

[54] METHOD FOR READING OUT DATA FROM AN X-RAY DETECTOR

[75] Inventors: David B. Schick, Flushing; Daniel A. Neugroschl, New York; David B. Plass, Merrick; Jonathan Singer, Dobbs Ferry, all of N.Y.

[73] Assignee: Schick Technologies, Inc., Long Island City, N.Y.

[21] Appl. No.: 09/184,040

[22] Filed: Nov. 2, 1998

Related U.S. Application Data

[63] Continuation of application No. 08/870,381, Jun. 6, 1997.

[51] Int. Cl.[7] .................................................. H05G 1/64
[52] U.S. Cl. ........................................ 378/98.8; 378/98.7
[58] Field of Search ................................. 250/98.8, 98.7

[56] References Cited

U.S. PATENT DOCUMENTS

| | | |
|---|---|---|
| 4,160,997 | 7/1979 | Schwartz . |
| 4,660,090 | 4/1987 | Hynecek . |
| 5,043,582 | 8/1991 | Cox et al. . |
| 5,079,426 | 1/1992 | Antonuk et al. . |
| 5,101,174 | 3/1992 | Hynecek . |
| 5,150,394 | 9/1992 | Karellas . |
| 5,161,178 | 11/1992 | Honda et al. ........................ 378/98.12 |
| 5,220,170 | 6/1993 | Cox et al. . |
| 5,434,418 | 7/1995 | Schick . |
| 5,436,476 | 7/1995 | Hynecek . |
| 5,465,284 | 11/1995 | Karellas . |
| 5,471,515 | 11/1995 | Fossum et al. . |
| 5,513,252 | 4/1996 | Blaschka et al. ....................... 378/98.8 |
| 5,528,043 | 6/1996 | Spivey et al. ....................... 250/370.09 |
| 5,572,037 | 11/1996 | Liu et al. . |
| 5,629,524 | 5/1997 | Stettner et al. ..................... 250/370.09 |
| 5,693,948 | 12/1997 | Sayed et al. ............................ 378/98.8 |
| 5,694,448 | 12/1997 | Morcom ................................ 378/98.8 |
| 5,887,049 | 3/1999 | Fossum ................................. 378/98.8 |

FOREIGN PATENT DOCUMENTS

| | | |
|---|---|---|
| 0707416 | 4/1996 | European Pat. Off. . |
| 0707417 | 4/1996 | European Pat. Off. . |
| 0714038 | 5/1996 | European Pat. Off. . |
| WO9635372 | 11/1996 | WIPO . |

OTHER PUBLICATIONS

Fossum, Eric R., Active Pixel Sensors: "Are CCD's Dinosaurs?" Proc. SPIE vol. 1900, pp. 2–14, Jul., 1993.

Mendis, Sunetra, et al., "CMOS Active Pixel Image Sensor," IEEE Transactions on Electron Devices, vol. 41, No. 3, pp. 452–453, Mar., 1994.

Armstrong, L., et al., "NASA's Tiny Camera Has A Wide–Angle Future", Business Week, Mar. 6, 1995.

*Primary Examiner*—Craig E. Church
*Attorney, Agent, or Firm*—Fitzpatrick, Cella, Harper & Scinto

[57] ABSTRACT

An x-ray detector includes a scintillator that converts an invisible-radiant-energy image into a visible-light image and a sensor array that converts the visible-light image into an electrical signal. The sensor array comprises a plurality of CMOS active pixel sensors.

10 Claims, 8 Drawing Sheets

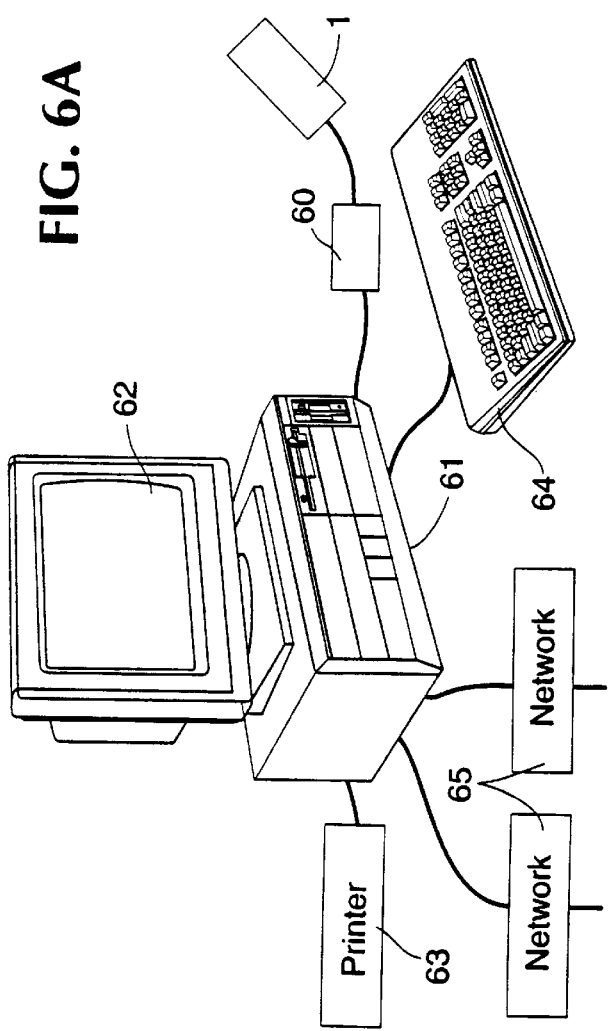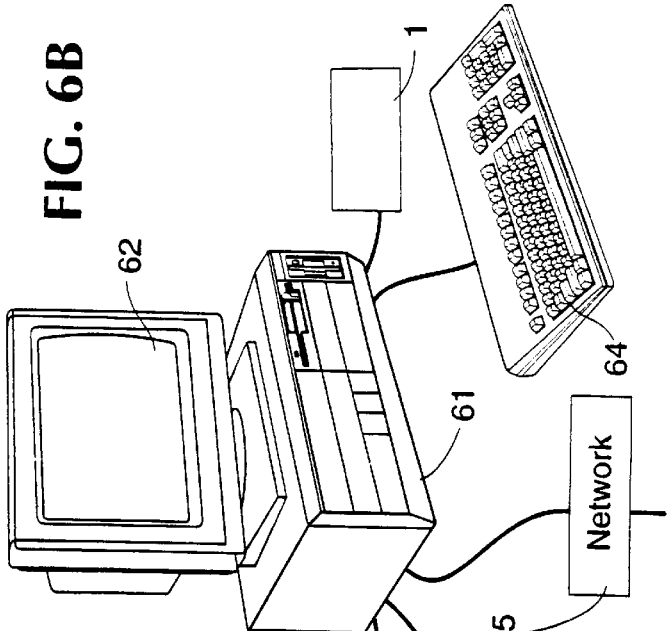
FIG. 6A
FIG. 6B
FIG. 7

METHOD FOR READING OUT DATA FROM AN X-RAY DETECTOR

This application is a continuation of application No. 08/870,381, filed Jun. 6, 1997.

BACKGROUND OF THE INVENTION

1. Field of the Invention

This invention relates generally to a system that detects x-rays using active pixel sensor arrays.

2. Discussion of the Related Art

X-ray detection has long served as a useful diagnostic tool in a wide variety of fields. In the medical field, for example, x-ray detection has been used to capture images representing parts of a patient s body, which images are then used in diagnosis and treatment. X-rays have also long been used in bone densitometry (i.e., the measuring of bone density). In the dental and related fields, x-rays are used to take images of a patient s teeth or other areas of a patient s mouth. X-ray detection is also used in industrial fields, such as, for example, to detect defects in pipe welds or aircraft joints, or to perform non-destructive testing on materials such as ceramics or glass bottles. X-ray detection is also used in spectroscopy, to determine such things as the crystal spacing or particle composition of a material under test. X-ray detection is also used in the surveillance and security fields, such as, for example, in an airport luggage scanning system. X-ray detection is used in other fields as well.

The most conventional x-ray detection techniques use photosensitive film to register an image. For example, in conventional dental x-ray detection, a film cartridge is placed in the patient s mouth. The film is exposed to x-rays which have passed through the soft tissue of the patient s mouth. Chemical development of the film in the cartridge produces an image which provides information that assists the dentist in making a diagnosis and providing appropriate treatment.

Film is used in medical x-ray detection as well. For example, a chest x-ray can be taken by placing a large piece of film in front of the patient, and passing x-rays through the patient s body from the back. Here again, the film must be developed using chemicals to provide an image that is useful in making a diagnosis and providing treatment to the patient.

The drawbacks of using film to register the x-ray image are well known. Foremost among these are the cost and inconvenience involved in developing the film to obtain an image. To begin with, the development process requires the use of chemicals. Such chemicals are expensive, troublesome to store and can also have a negative impact on the environment. The development process is also time consuming. The x-ray technician, operator or physician, after exposing the film to x-rays, must develop it in a darkroom or a closed processor.

In dental radiography, the relatively high dosage of radiation which the patient must receive to expose the film sufficiently is also a major drawback. Although the average radiation dosage per exposure using film has been reduced over the years, the maturity of the conventional film technology would suggest that further significant decrease in the required dosage is unlikely.

In view of the above problems, a number of methods of x-ray imaging have been proposed which do not require the use of film. Many of these systems operate by converting the x-rays, by use of a scintillator, into visible light, and subsequently converting the visible light into electrical signals which can be processed by electronic circuits to create an image on a display to form an image.

In the intraoral radiography field, for example, the pioneer patent is U.S. Pat. No. 4,160,997, issued to Dr. Robert Schwartz and hereby incorporated by reference. Other examples include U.S. Pat. No. 5,434,418, issued to David B. Schick and assigned to the assignee of the present application, and U.S. Pat. No. 4,987,307, issued to Giorgio Rizzo and Cesare Gadda.

Each of these patents describes a x-ray detector which includes a scintillator screen, and a separate and distinct Charge-Coupled Device (CCD). The scintillator screen converts the x-rays emerging from a radiated tooth into visible light, while the CCD converts the light into electrical signals. These devices, while solving many of the problems with photographic film, have problems inherent to their design.

These problems stem from the use of a charge-coupled device (CCD) as the image conversion device. In a CCD, packets of electrical charges are stored in one of an array of discrete locations (known as "pixels"), with the amount of charge created and stored in each pixel corresponding to the intensity of light hitting the device at that location. The amount of charge stored in each pixel is read out by the successive application of control voltages to the device, which control voltages cause the packets of charge to be moved from pixel to pixel to a single output circuit. Through this process, the output circuit produces an analog electrical signal the amplitude of which at a given point in time represents the intensity of light incident on the device at a particular correspondence spatial location.

A CCD relies in its operation on the transfer of electrons from one pixel to another, a process that is often analogized to a "bucket brigade." Accordingly, before reaching the output circuit, the transferred electrons must pass though silicon for macroscopic distances, on the order of centimeters. Because of this, the ratio of electrons successfully transferred to the number left behind per electrode, the so-called "charge transfer efficiency" (CTE), must be as close as possible to perfect (i.e., no electrons left behind) to ensure acceptable performance of the CCD.

In addition, since net CTE varies exponentially with the number of charge transfers, the requirement for transfer efficiency becomes more stringent as CCD array sizes become larger. Also, manufacturing yield may decrease as the array size increases, since CCDs are vulnerable to single point defects that can block an entire column, rendering the entire device unusable.

CCDs also require special manufacturing techniques to achieve the required high CTE. As a result of the necessity of using such techniques, CCDs are not integratable with low power CMOS circuits, the technology most appropriate for low power integration of on-chip timing and driver electronics that is required for instrument miniaturization. Moreover, since CCDs require 12–26 volts of power, devices using this technology can present something of a shock hazard.

Other devices have also been used as the image conversion device in lieu of CCDs. For example, U.S. Pat. No. 5,043,582 to Cox et al. describes an x-ray imaging system constructed from a light sensitive dynamic random access memory (DRAM). The device is non-monolithic, consisting of a first layer of light sensing elements (a "focal plane array") and a second layer of transistors for reading out data from the light sensing elements, with the layers interconnected with indium bump bonds. The non-monolithic nature of these structures, however, inherently causes a number of problems. To begin with, the fabrication processes for such devices are very complex and low yielding, making the systems expensive to produce. Further, the separate layers thermally expand and contract at different rates, resulting in reliability problems with the device. In addition, the passive nature of these devices (i.e., the absence of an active transistor within the pixel unit cell) results in a high readout noise.

X-ray sensor arrays have also been made of amorphous silicon. Such devices comprise generally an array of amorphous photodiodes, and an array of thin-film transistors which select the photodiodes that are to be read out. Such devices, however, are passive, and, like the system described in the Cox et al. patent, suffer from high readout noise. In addition, there are limitations as to how small pixels in non-monolithic devices can be made, since advanced photolithographic techniques cannot be used. These pixel size limitations in turn limit the resolution that can be achieved.

Recently, Active Pixel Sensor (APS) technology has provided an alternative to CCDs and other sensing devices for converting light into electrical signals. This technology is shown, for example, in U.S. Pat. No. 5,471,515 to Fossum et al., and hereby incorporated by reference. In general terms, an APS array is defined as an array of light sensors having one or more active transistors associated with each pixel. The transistors, which are the pixel s "active" elements, perform gain or buffering functions.

Because each pixel has its own active element, the charges that collect below each photosite need not be transferred through a "bucket brigade" during the readout period, as in a CCD. Thus, the need for nearly perfect charge transfer is eliminated. Accordingly, an APS array does not exhibit the negative attributes associated with charge transfer across macroscopic distances required by the CCD.

Also, since APS devices can be manufactured using standard CMOS techniques, the array can operate on 5 volt power, minimizing the shock hazards of the device. An additional advantage of utilizing APS technology in x-ray applications is that CMOS wafers are made in much larger diameter than are CCD wafers. This would allow for the manufacture of very large devices for other radiology applications, such as mammography, fluoroscopy, orthopedics, etc.

While APS arrays have of late enjoyed a good deal of attention from those constructing light detecting devices—such as in the high definition television (HDTV) and electronic still camera fields—they have not heretofore been used to construct an x-ray detector. The reasons for this are several. To begin with, an x-ray detector is generally constructed by disposing a scintillator on top of a light sensing device, so that the scintillator first converts incident x-rays into visible light, and the light sensing device in turn converts the visible light into electrical signals. Some fraction of the x-rays that enter the scintillator, however, will invariably exit the scintillator and impinge upon the light sensing device. Such unconverted x-rays would be registered by conventional APS devices, and cause spurious signals to be created, which would, in turn, result in a noisy image.

In addition, the visible light emitted by scintillators is typically in the blue-green portion of the visible spectrum. APS arrays, however, are widely believed to exhibit a very poor response to blue-green light, leading in turn to the belief that APS arrays are not suitable for use in x-ray detectors.

Another problem with x-ray detectors is event detection. Since x-ray detectors are generally manufactured separately from, and not synchronized with, the source of x-rays, the x-ray detector must have some mechanism for determining when it has been exposed to x-ray rays, so that it knows when to read out the data. This problem does not exist with the devices such as digital cameras, since the visible radiation which cameras sense is either always present or is provided from a flash that is synchronized with the operation of the camera.

Also, APS devices have a higher dark signal (i.e., thermally generated currents produced by the device when not exposed to radiation) than CCDs, since the dark signal in CCDs can be significantly reduced by operating the device in the multi-phase pinned (MPP) mode. This is believed to make APS arrays less suitable as x-ray detectors than as light detectors. In particular, because scintillators emit a much smaller number of photons than are present in a light sensing environment (such as, for example, a photography environment), the dark signal is believed to be more problematic in an x-ray detector, since the dark signal, if not corrected for, will have a greater impact on the signal-to-noise ratio.

Furthermore, it has been theorized that CMOS transistors, which are the type used in constructing APS devices, are more susceptible to damage and noise generation from high frequency radiation such as x-rays than the MOS transistors used in CCDs. Still further, it has been theorized that large APS arrays will have poor manufacturing yields.

There is a need, therefore, for a new type of x-ray detector that solves the problems of conventional x-ray detectors by exploiting APS technology, while at that same time overcoming the real and perceived drawbacks associated with using APS arrays to detect x-rays.

SUMMARY OF THE INVENTION

One object of the present invention is to provide an x-ray detector which does not exhibit the disadvantages of CCDs or the other image conversion devices discussed above.

Another object of the present invention is to provide an x-ray detector that utilizes APS technology.

Another object of the present invention is to provide an x-ray detector in which the active pixel sensors and circuitry for reading out the active pixel sensors are monolithically formed on a semiconductor substrate.

In accordance with one aspect at the present invention, an x-ray detector is provided that includes a scintillator that converts an invisible-radiant-energy image into a visible-light image, and a sensor array that converts the visible-light image into an electrical signal, the sensor array comprising a plurality of CMOS active pixel sensors.

In accordance with another object of the present invention, each active pixel sensor includes a photogate electrode, a transfer gate electrode, a reset electrode and a semiconductor channel underlying the electrodes.

In accordance with yet another object of the present invention, each active pixel sensor includes a transfer gate electrode, a reset electrode and a semiconductor channel underlying the electrodes, the semiconductor channel including a photodiode formed by a p-n junction.

In accordance with yet another embodiment of the present invention, the semiconductor channel is formed in a shallow n-type well or p-type well on the top of the semiconductor substrate.

In accordance with still another embodiment of the present invention, a method of reading out data from an x-ray detector is provided that includes the steps of continuously reading out frames of data from the x-ray detector, and determining whether the x-ray detector was exposed to x-rays by examining each read out frame of data.

BRIEF DESCRIPTION OF THE DRAWINGS

FIG. 6A is a schematic diagram illustrating one embodiment of the x-ray detector of the present invention being utilized in a computerized diagnostic system.

FIG. 6B is a schematic diagram illustrating another embodiment of the x-ray detector of the present invention being utilized in a computerized diagnostic system.

FIG. 7 is an illustration of the x-ray detector of the present invention being connected to a small radio transmitter.

DETAILED DESCRIPTION OF THE PREFERRED EMBODIMENT

Figure 1:
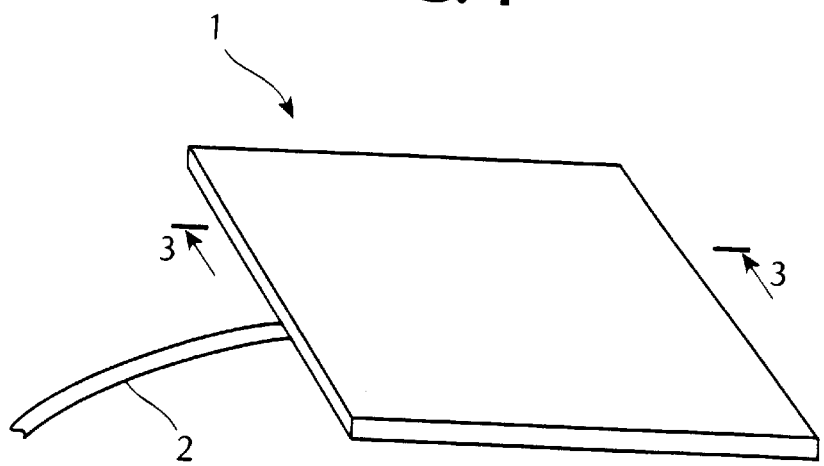
FIG. 1 is an isometric view of the x-ray detector of the present invention.

FIG. 1 depicts in a very general manner the x-ray detector of the present invention. The detector 1 is connected to a cable 2, which transmits the electrical signals generated by the x-ray detector to peripheral processing circuitry (not shown) which may, by way of example, be integrated with a personal computer (also not shown).

Figure 2A:
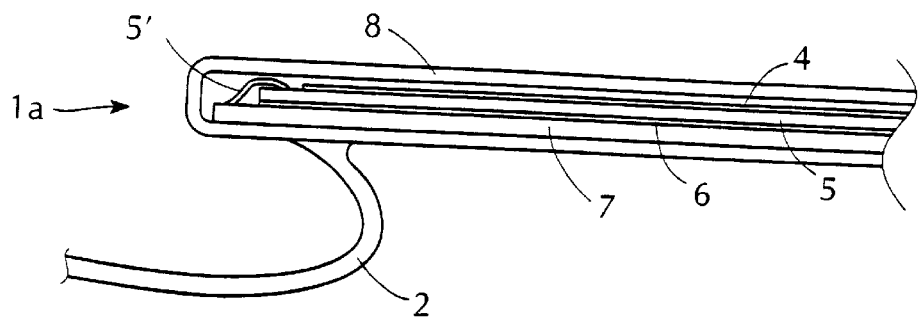
FIG. 2A is a magnified cross sectional view of one embodiment of the x-ray detector shown in FIG. 1, taken from section line 3—3.
Figure 2B:
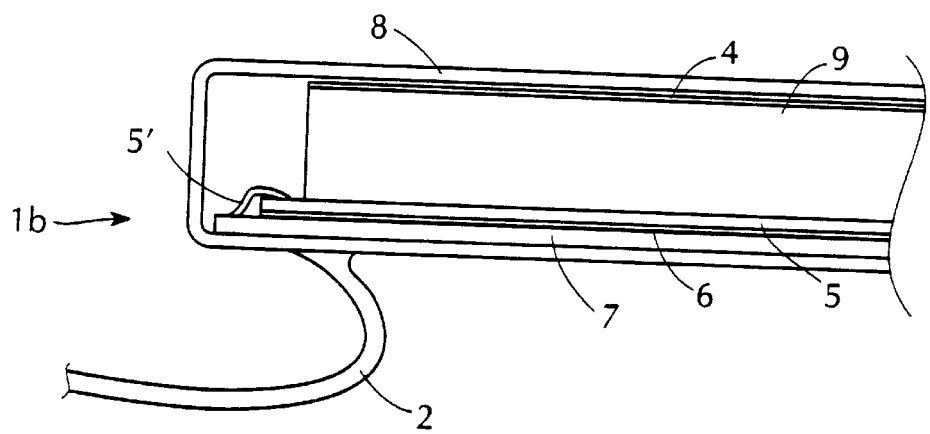
FIG. 2B is a magnified cross sectional view of another embodiment of the x-ray detector shown in FIG. 1, taken from section line 3—3.
Figure 2C:
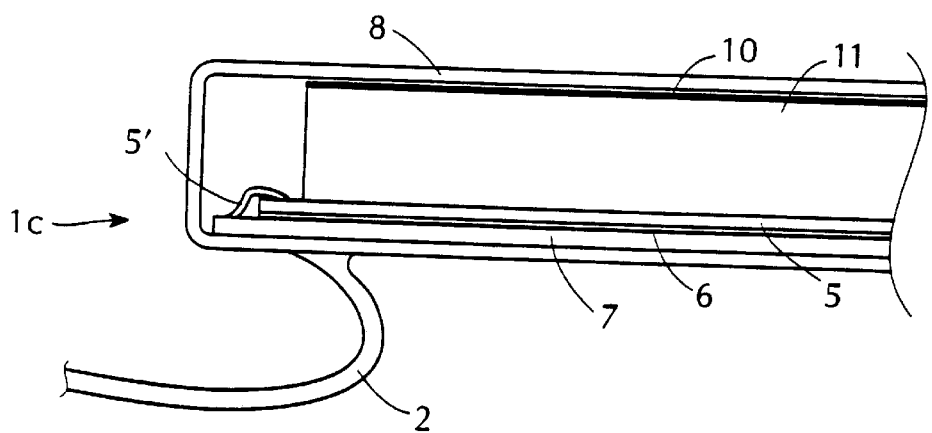
FIG. 2C is a magnified cross sectional view of yet another embodiment of the x-ray detector shown in FIG. 1, taken from section line 3—3.

FIGS. 2A–2C are magnified cross sectional views of three embodiments of the x-ray detector of FIG. 1, taken from section line 3—3. In the embodiment shown in FIG. 2A, the x-ray detector includes a scintillator 4 on top of a semiconductor 5 on top of a tungsten layer 6, all supported on a passivated ceramic substrate 7. In general terms, the scintillator 4 converts x-rays into visible light, while the semiconductor 5, in turn, converts the light into electrical signals representing the image. The tungsten layer 6 absorbs any x-rays which were not converted by the scintillator 5 to those x-rays from hitting the patient, and absorbs any backscattered radiation. The semiconductor 5 comprises a large area semiconductor image array of APS pixels and an integrated signal amplifier converted. The electrical signals produced by the semiconductor 5 are conveyed to the cable 2 via conductive lead 5'. The conductive lead 5' may also convey electrical power and control signals from the computer to the semiconductor 5. The entire x-ray detector is enclosed in a protective aluminum enclosure 8, pervious to x-ray radiation, which protects the x-ray detector from shock and enables it to be moisture resistant.

The scintillator layer 4 is interposed between the x-ray source and the semiconductor layer 5, to both protect the semiconductor from unwanted x-ray exposure and to provide conversion of the x-rays to visible light for direct detection by the semiconductor. The scintillator layer may be composed of gadolinium oxysulphate ($GD_2SO_5$) or thallium-doped cesium iodide (CsI(Tl)). Each of these materials is sensitive to x-ray photons, and efficiently converts them into visible photons in the 500–600 $\mu$m range. Other x-ray-to-light converting materials that may be used for the scintillator include cadmium telluride, cadmium sulfide, calcium tungstate ($CaWO_4$), zinc sulfide and zinc cadmium sulfide. Scintillating glass, such as for example terbium glass, or scintillating optical fibers may also be used. The scintillator 4 is positioned to be directly exposed to the x-rays which readily pass through the protective aluminum enclosure 8.

In x-ray imaging, as discussed above, the x-rays are first converted into visible light by the scintillator. However, as also discussed above, the scintillator will not convert 100% of the x-rays that it receives; some x-rays will inevitably pass through the scintillator unconverted. Such unconverted x-rays cause a very large local charge which, if registered by the pixels, can create noise and dark spots in the resultant image.

One way to limit the unconverted x-rays from being registered by the APS array is to interpose a fiber optic faceplate between the scintillator 4 and the semiconductor 5. This embodiment is illustrated in FIG. 2B, which includes a fiber optic faceplate 9 between the scintillator 4 and the semiconductor 5. The fiber optic faceplate will absorb a good portion of the unconverted x-ray before they reach the APS array.

Another technique is to use scintillating fibers, which fibers absorb x-rays and emit visible light corresponding in intensity to the intensity of the x-rays. This embodiment is illustrated in FIG. 2C, which does not include a scintillator, but instead includes a scintillating fiber optic faceplate 11 on top of the semiconductor 5. In this embodiment, a reflective coating 10 is placed upon the scintillating fiber optic faceplate 11, to ensure that no visible light enters or exits from the tops of the fibers. The scintillating fibers emit a much smaller amount of unconverted x-rays than do conventional scintillating screens.

As can be readily seen from the FIGS. 2A–2C, however, using a fiber optic faceplate 9 or a scintillating fiber optic faceplate 11 results in a significantly thick sensor. Accordingly, in one embodiment of the present invention, a novel well structure is employed to prevent unconverted x-rays which do reach the APS array from contributing to the image. The novel well structure can either eliminate the need for fiber optics in the sensor, or can allow a thinner fiber optic faceplate or scintillating fiber optic faceplate to be used.

In accordance with this aspect of the invention, the photosite (e.c., the channel underlying the photogate electrode, the transfer gate electrode and the reset electrode and the floating diffusion and drain diffusion nodes) is formed in a relatively shallow n-well or a p-well. Visible light photons are relatively low in energy, and are therefore absorbed in the upper part of the semiconductor. X-ray photons, on the other hand, are relatively high in energy, and are absorbed almost exclusively deep in the semiconductor. Only the charge accumulated in the well (i.e., the charge created in response to visible light photons) is read out and contributes to the image signal; the charge accumulated below the well (i.e., the charge created in response to incident x-rays) is prevented by the well from contributing to the signal.

It should be noted that in light detection applications, such as, for example, camera applications, a shallow well structure is undesirable. This is because the longer wavelength colors of the visible light spectrum (such as red and orange) tend to be absorbed deeper in the silicon. Therefore, if an APS array having a shallow well structure were used in a camera, charge created in response to such longer wavelength light would not be read out and would not contribute to the output signal. This phenomenon does not cause a problem in the x-ray detector of the present invention, however, since the APS array need only register the shorter wave-length blue and green light emitted by the scintillator, and need not register any longer wavelength colors. The shallow well structure is therefore eminently desirable in an x-ray detector, in that it allows the light from the scintillator to contribute to the output signal, while preventing any incident x-rays from contributing.

Figure 3A:
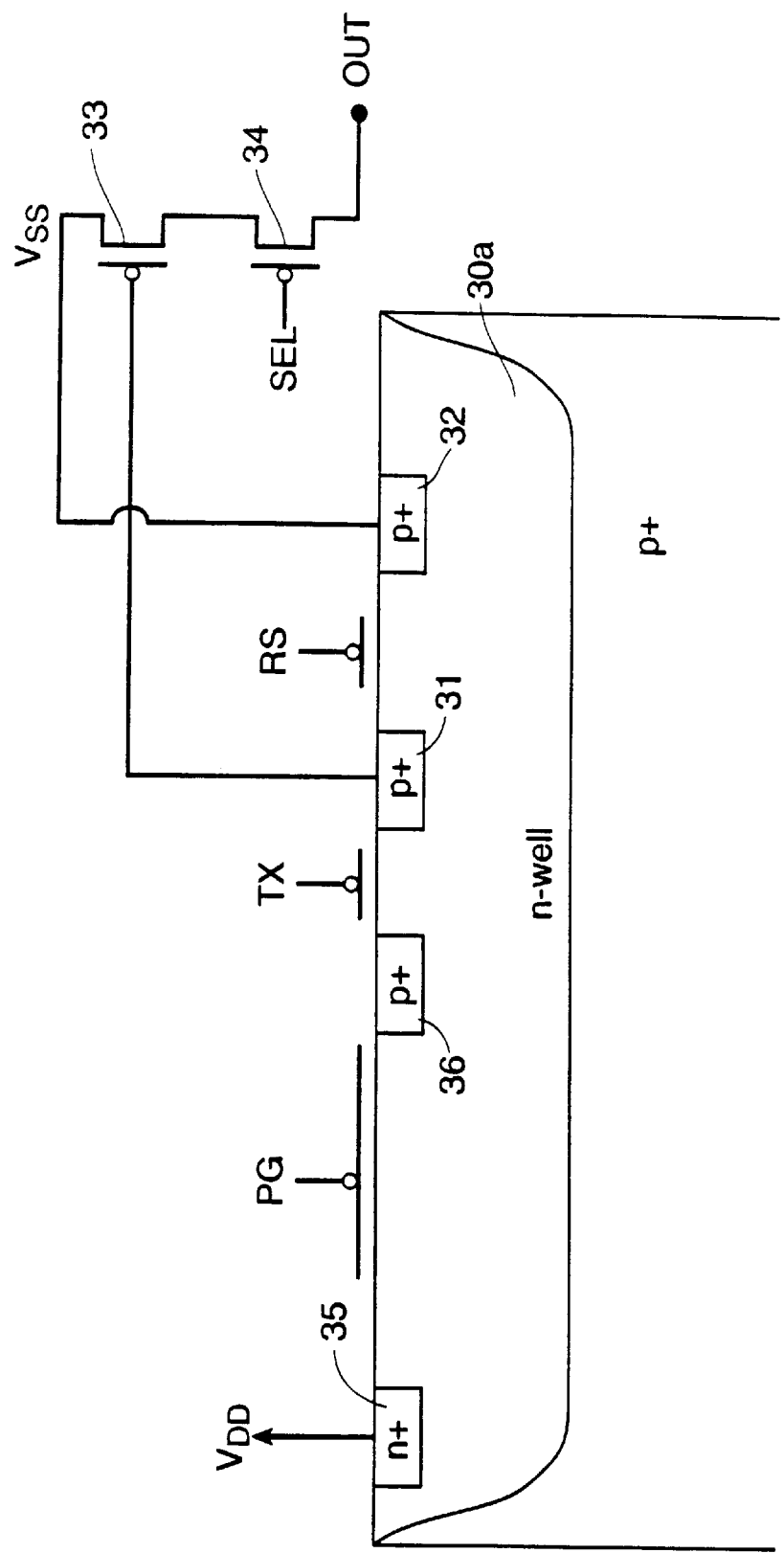
FIG. 3A is an illustration of an n-well structure according to one embodiment of the present invention.

FIG. 3A illustrates an embodiment of the novel well structure of the present invention that incorporates a photogate. In this embodiment, the photosite is formed in a thin well 30a, created by the diffusion of dopants into the semiconductor. This well should be less than $5\mu$ in thickness, and should most preferably be between $1.5\mu$ and $2\mu$. The well 30a is an n-well, formed by diffusing an n-dopant or n-dopants into a semiconductor substrate—in this case a p+ bulk silicon wafer. Since silicon is a very poor absorber of x-rays of average energy of 35 KeV, very few x-rays (less than 0.1%) will be absorbed in the top $5\mu$ of the silicon. Therefore, only the x-rays which are absorbed by the n-well (which is less than $5\mu$ in thickness) can contribute to the image. Moreover, the n-well and the remainder of the p+ silicon forms a diode structure between the active region and the substrate to inhibit migration into the active region of photogenerated charge produced in the substrate.

As can be seen in FIG. 3A, the pixel includes a relatively large photogate electrode PG, a transfer gate electrode TX, a floating diffusion node 31, a reset electrode RS and a drain diffusion node 32. Light impinging on the pixel causes charge to accumulate in the photogate (that portion of the well beneath the photogate electrode PG), with the of charge corresponding to the intensity at the light.

The floating diffusion node 31 is connected to the gate of field effect transistor (FET) 33, the drain of which is connected to drain diffusion node 32, and to a constant supply voltage $V_{ss}$. The source of FET 33 is connected to the drain of row select FET 34, which receives at its gate a row select signal SEL and in response produces at its source an output signal OUT. By the appropriate application of voltages to the electrodes and the FETs, the charge accumulated in the photogate can be read-out of the pixel, with the resultant voltage of the signal OUT being proportional to the amount of accumulated charge. And because the well 30a is so shallow, the amount of charge accumulated will be almost exclusively a function of the amount of visible light incident on the pixel, and not a function of the amount of x-rays. Accordingly, only the visible light will contribute to the output signal.

The pixel illustrated in FIG. 3A also includes an n+ plug 35 to the left of the photogate electrode PG that connects the well to a known voltage VDD to reverse bias the n–p+ junction formed by the well and the remainder of the silicon. Also, the pixel includes a p+ node 36 which blocks the electrons that form under the photogate electrode PG 36 from flowing to under the transfer gate electrode TX when the transfer gate electrode TX is not properly biased (i.e., when the pixel is not being read out).

Figure 3B:
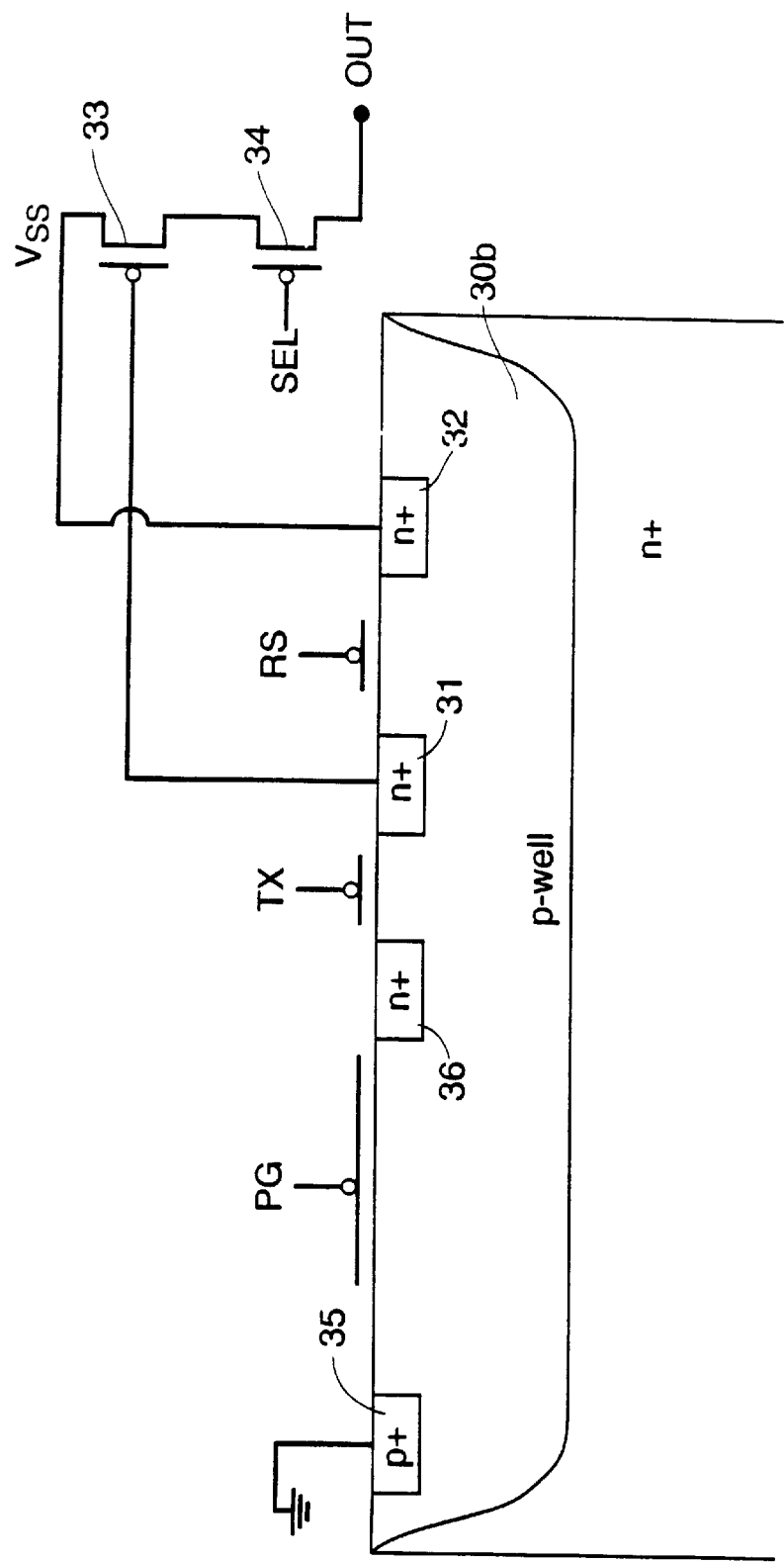
FIG. 3B is an illustration of a p-well structure according to another embodiment of the present invention.

FIG. 3B illustrates another embodiment of the present invention, in which the well 30b is a p-well, formed by diffusing a p-dopant or p-dopants into an n+ bulk silicon wafer. As can be seen, the nodes 31, 32 and 36 in this embodiment are n+ nodes, and the plug 35 is an p+ plug connected to a known voltage of ground (i.e., zero potential).

Figure 3C:
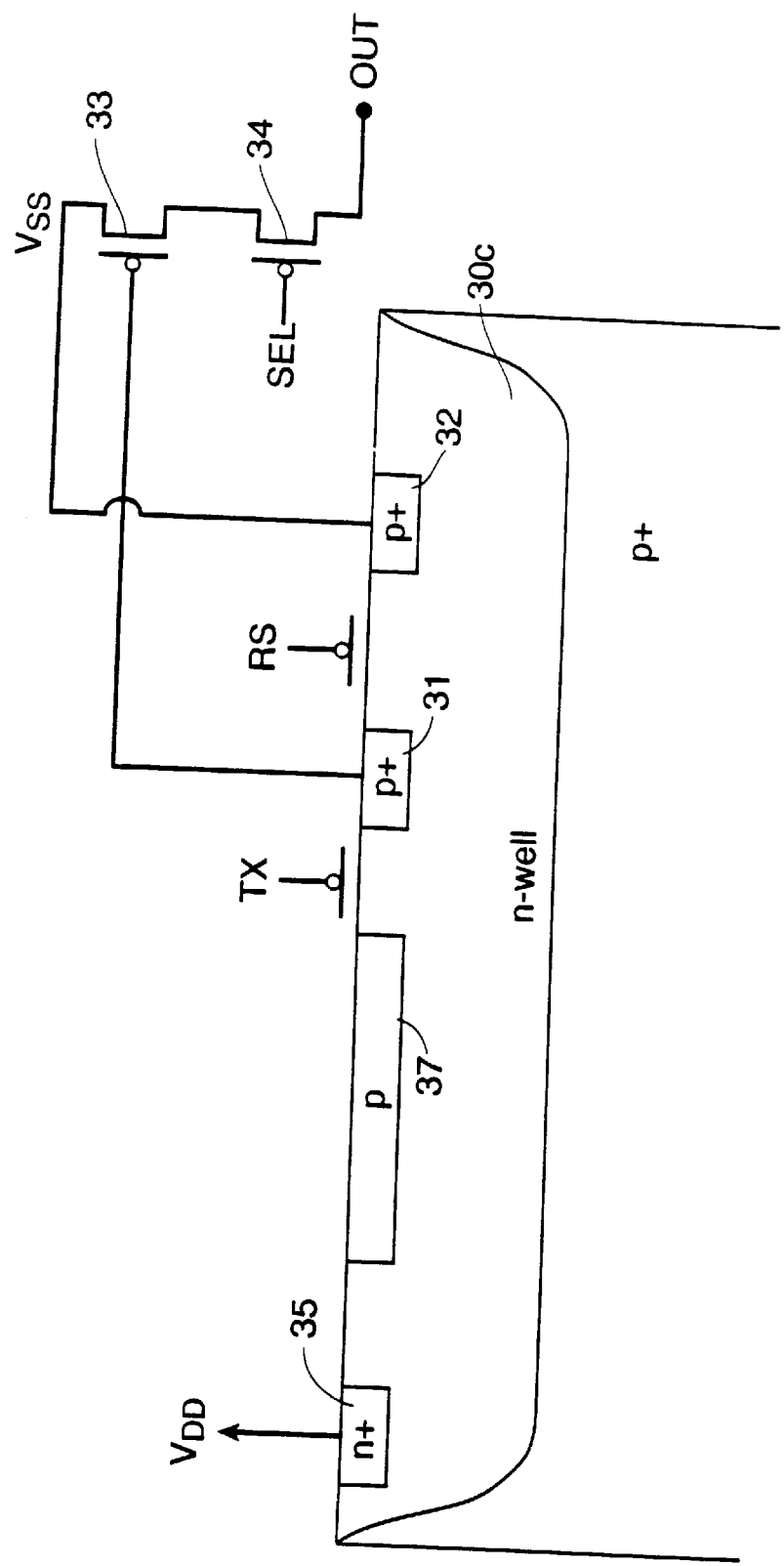
FIG. 3C is an illustration of an n-well structure according to yet another embodiment of the present invention.

FIG. 3C illustrates a photodiode embodiment of the present invention. In this embodiment, a very thin p-layer 37 is formed by the diffusion of a p-dopant or p-dopants into an n-well 30c, with the photodiode being formed by the junction between p-layer 37 and the n-well 30c. The photodiode has a junction capacitance and acts as a capacitor in operation. More particularly, each time a pixel is read out, the photodiode is charged to some known voltage. Photons absorbed in the n-well 30c (i.e., visible light photons) cause the photodiode to discharge, with the specific amount of discharge proportional to the number of photons that impinge upon the pixel. Photons absorbed below the well (i.e., x-ray photons) do not cause the photodiode to discharge. The remaining charge, therefore, represents the intensity of the light incident upon the pixel.

The pixel of the embodiment illustrated in FIG. 3C also includes a transfer gate electrode TX, a floating diffusion node 31, a reset electrode RS, a drain diffusion node 32, FETs 33 and 34 and an n+ plug 35 connected to $V_{DD}$. By the appropriate application of voltages to the electrodes and the FETs, the pixel can be read out to produce an output signal OUT proportional to the amount of charge remaining in the photodiode.

In each of the embodiments illustrated in FIGS. 2A–2C, the cable 2 may extend directly to a computer for the direct input of the electrical imaging signals, or may, in order to prevent entanglement in or tripping over wires, be made short and extend only to a short range radio transmitter for transmission of the electrical imaging signals to the computer.

Figure 4A:
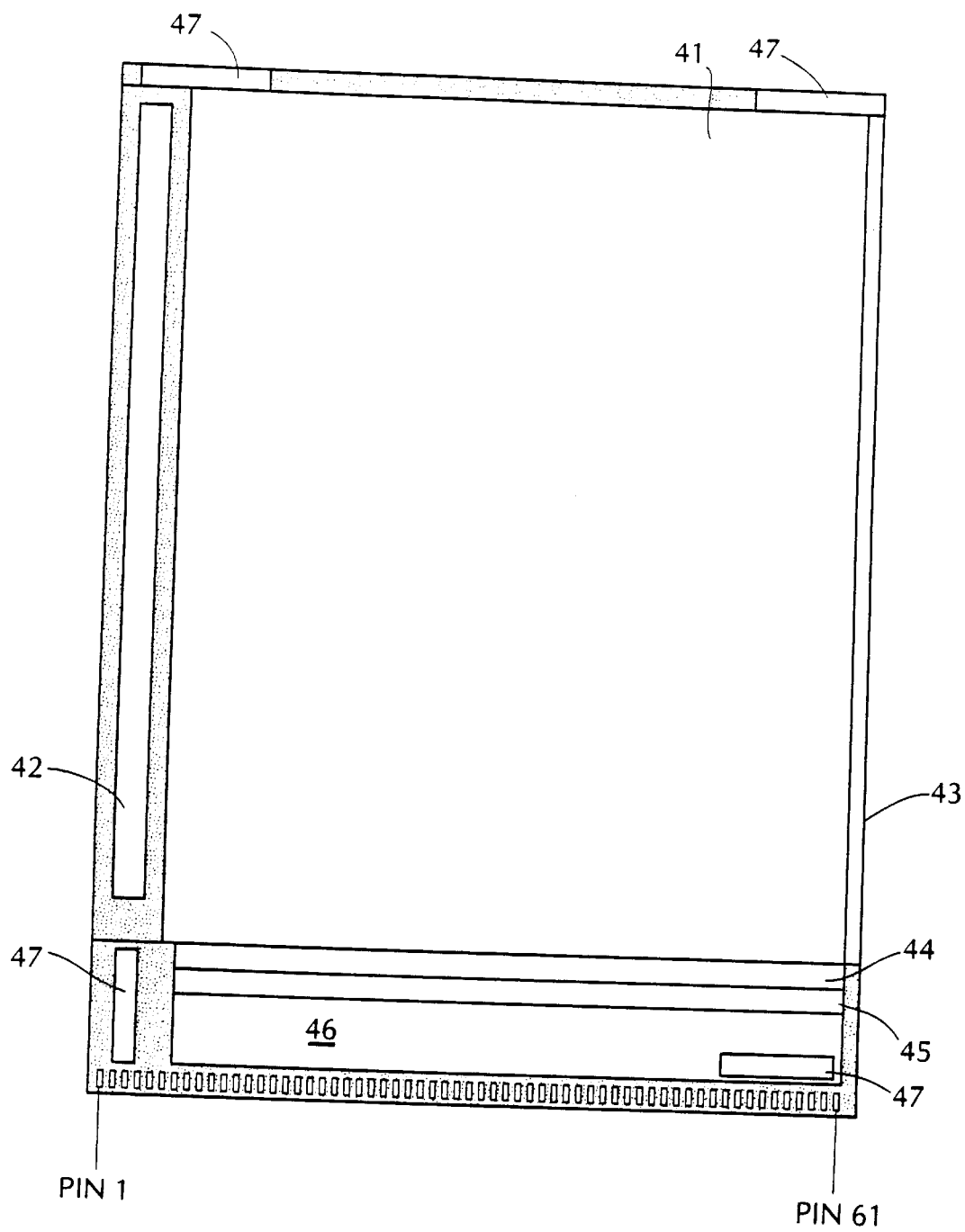
FIG. 4A is a schematic diagram of an individual active pixel sensor according to one embodiment of the present invention.
Figure 4B:
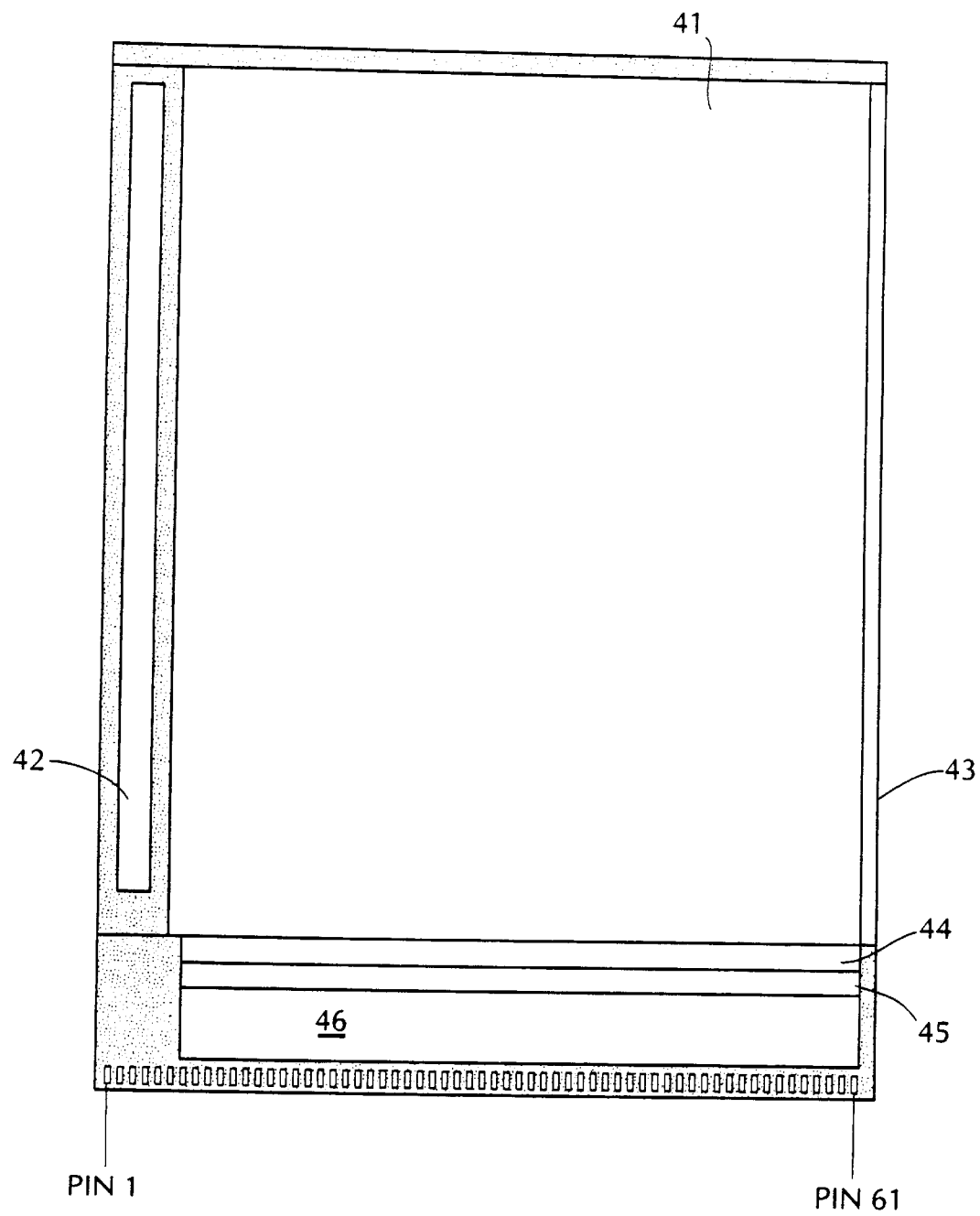
FIG. 4B is a schematic diagram of an individual active pixel sensor according to another embodiment of the present invention.

FIGS. 4A and 4B illustrate two embodiments of the present invention, both versions of which include an APS array 4. For mammographic and dental applications, the pixels in the array should be preferably less than $50\mu$. For other applications, the pixels may be larger. The APS array is self scanning, and contains on-chip all of the circuitry required to control the exposure and readout of the image. Row SR & PG drivers 42 are used to drive the rows of constituent APS pixels, APS reset drivers 43 supply reset signals to the reset electrodes of the APS pixels. Column signal chain 44, column shift registers 45, and timing and control circuitry 46 controls the reading out of the array. Pins 1 through 61 provide an input/output interface for the device.

In the embodiment illustrated in FIG. 4A, the array incorporates several discrete event trigger diodes 47 which detect incident x-rays and output a signal indicative of the presence of the incident x-rays. The outputs of the event trigger diodes 47 are monitored by the computer to determine the start and end of the x-ray exposure. This method allows for accurate exposures to be taken without the need to synchronize the x-ray source with the computer.

Thus, in this embodiment, the data stored in the APS array are not read out until the event trigger diodes 16 generate the output signal, indicating that the device has been exposed to x-rays. After that signal is generated, the APS array is read, and the data obtained is stored in memory. The APS array is then read again. Since the act of reading out the data in the first instance effectively discharges the data from the pixels in which they are stored, the data obtained in the latter read out represents a "dummy" or "dark" exposure, i.e., an read-out of data from the array produced when no light or x-rays are incident upon it. The data generated by the pixels in this condition, the so called "dark signal," is subtracted from the data obtained in the first read out, to correct for dark current.

While using event trigger diodes is a generally good method of event detection, it has some drawbacks. Most notably, the incorporation of event trigger diodes into the device lowers the manufacturing yield of the APS array, since a malfunction in any of the event detection diodes will cause the entire APS array to be inoperable. Also, the diodes may themselves be blocked by some x-ray impervious portion of the material under test, or may be out of one field of the x-ray beam entirely.

Figure 5:
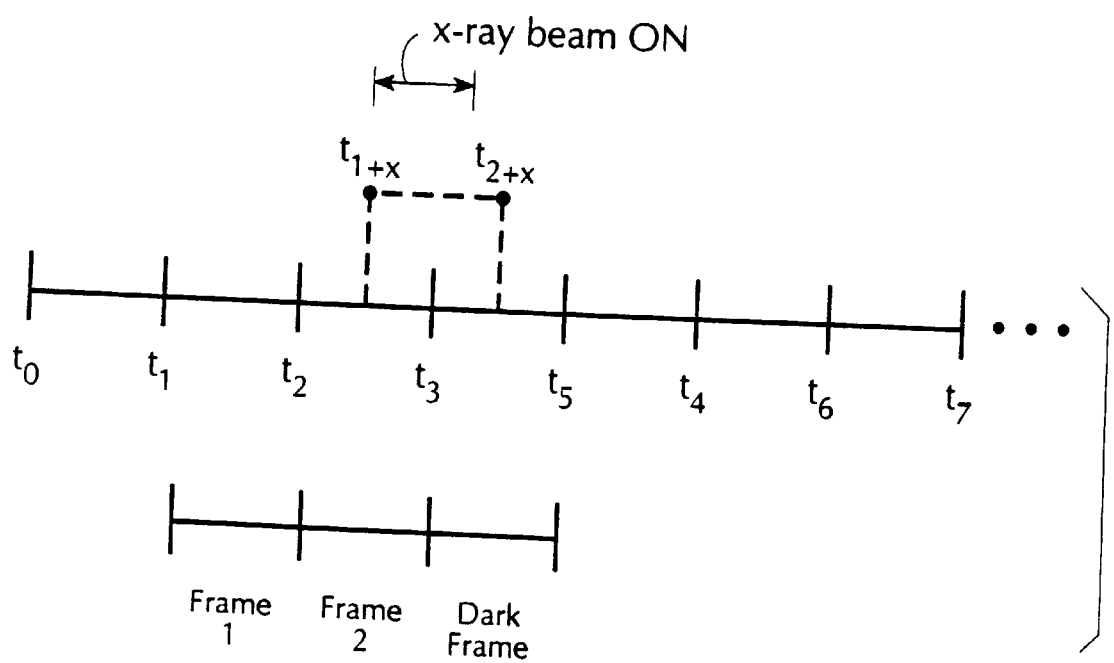
FIG. 5 is a time line illustrating a method for reading out from an x-ray detector according to one embodiment of the present invention.

Accordingly, in a preferred embodiment of the present invention, illustrated in FIG. 4B, event detection diodes 47 are not incorporated into the APS device. Instead, the invention incorporates a novel event detection technique, in which the data stored in the APS device is constantly being read out. This technique will be described with reference to FIG. 5. In FIG. 5, the times $t_0$, $t_1$, $t_2$, $t_3$, etc., represent the times at which a new readout of the APS array is begun. Thus, the entire APS array (i.e., all pixels of the array) is read out between times $t_0$ and $t_1$, between times $t_1$ and $t_2$, between times $t_2$ and $t_3$, and so on, on a continuous and repetitive basis.

Once a read out of the entire array is completed (e.g. just before time $t_i$), the data obtained is stored in memory as a frame and examined. This examination is performed by comparing the data in that frame to the data in a reference frame that was read-out of the array upon initialization of the x-ray detector, at a time at which it was known that it had not been exposed to x-rays. If the data in the frame under examination is substantially the same as the data in the reference frame, it is determined that the frame does not contain any "x-ray data," i.e., that the x-ray detector was not exposed to an x-ray beam during that readout, and that therefore none of the pixels during that frame contained data generated in response to impinging x-rays. This would be case, for example, with the data readout between times $t_0$ and $t_1$, since the x-ray beam was not on during that time. In such a case, the frame is discarded.

If, on the other hand, some of the data in the frame being examined is different from the data in the reference frame, it is determined that the x-ray beam was turned on at some point in time during the reading out of that frame, and the entire frame is stored as Frame 1, since at least some of the pixels during that frame contain x-ray data. Thus, in the example shown in FIG. 5, in which the x-ray beam was turned on at time $t_{1+x}$, the data read out during the frame $t_1$-$t_2$ is stored as Frame 1, since some of the pixels read-out during that frame contained x-ray data.

The subsequent frame is then read out and stored as Frame 2, since some of the pixels read-out during that frame will have contained x-ray data as well. The frame read after that is read out and stored as the Dark Frame, since it is known that the x-ray beam was not on during that frame, and that therefore none of the data read out represents x-ray data.

Thus, in the example shown in FIG. 5, the following is known concerning the data that have been stored:

(a) the data read out during Frame 1 prior to time $t_{1+x}$ do not represent not x-ray data (since the x-ray beam was not on during that time);

(b) the data read-out during Frame 1 subsequent to time $t_{1+x}$ represents x-ray data (since the x-ray beam was turned on at $t_{1+x}$, and all pixels in the array therefore contain x-ray data at that point);

(c) the data readout during Frame 2 prior to $t_{2+x}$ represent x-ray data (since those pixels were read during Frame 1 prior to $t_{1+x}$);

(d) the data readout during Frame 2 subsequent to time $t_{2+x}$ does not represent x-ray data (since those data were read out during Frame 1 between time$_{1+x}$ and $t_2$); and (e) none of the data read-out during the Dark Frame x-ray data (since the x-ray beam was not on, and all x-ray data was read out of the array between times $t_{1+x}$ and $t_{2+x}$.

Once Frame 1, Frame 2 and the Dark Frame are stored, the data in the Dark Frame is subtracted from the data in Frame 1 and the data in Frame 2, to compensate for the dark signal generated in the APS array. The data in Frame 1 and Frame 2 are then added, with the resultant data representing the image that was captured by the x-ray detector when it was exposed to the x-ray beam.

In the embodiment disclosed in FIG. 5, the read out time for one frame is 400 ms, and the x-ray beam is on for about 300 ms. Speaking more generally, the maximum possible duration of the x-ray beam from a typical x-ray source is approximately 400 ms. Accordingly, at a read out rate on one frame per 400 ms, an exposure cannot extend over more than two frames (i.e., 800 ms). Therefore, the addition of data from two frames guarantees that the data for a complete image is obtained, irrespective of when the exposure occurred. This technique eliminates the need to integrate photodiodes into the APS array, thereby reducing the costs and complexity of the system.

FIG. 6A illustrates the computer and associated peripherals used to acquire the images from the APS x-ray detector 1. The computer system may incorporate any or all of the following elements:

(a) A CPU 61;

(b) A data storage device (not shown), such as a removable or non-removable disk subsystem, to store the images;

(c) a display system, such as a high-resolution monitor 62 which can display colors and/or shades of grey;

(d) a printer 63 which can reproduce hard copies of the images; and (e) An operator interface, such as a keyboard 64, keypad (not shown) or pointing device (not shown). Devices for additional enhancements include:

(a) A high-speed modem (not shown) to transmit x-ray image data;

(b) A write-once optical-disk subsystem (not shown) for mass storage of images; and (c) A local-area network 65 to connect more than one system within an office.

With reference to the system shown in FIG. 6A, the x-ray detector 1 produces an analog signal which enters interface box 60. Interface box 60 digitizes the signal for computer processing by the CPU 61. The processing performed by the CPU 61 can be made available on a network 65 or to a single output device such as monitor 62 and/or printer 63. Appropriate instructions and manipulation of image data is effected via keyboard 64.

In a preferred embodiment of the present invention, as discussed above, the x-ray detector 1 includes an analog-to-digital converter that is integrated with the APS device. In such a case, as illustrated in FIG. 6B, the x-ray detector 1 outputs a digital signal, rather than an analog signal, and accordingly connects directly to the CPU, rather than connecting via interface box 60.

As shown in FIG. 7, the digitized signal may also be carried by a short (14' or 36 cm) cable 70a to short range radio transmitter 70 (which may include an internal analog to digital converter) for transmission to a receiver (not shown) housed in the CPU.

It is understood that the above description and drawings are illustrative of the present invention and detail contained therein are not to be construed as limitations on the present invention. Changes in components, procedure and structure may be made without departing from the scope of the present invention as defined in the following claims.

What is claimed is:

1. A method of reading out data from an x-ray detector, comprising the steps of:
   (a) continuously reading out from the x-ray detector frames of data representative of the entirety of the data contained therein; and
   (b) determining whether the x-ray detector was exposed to x-rays by examining each frame of data read out in step (a).

2. A method of reading out data from an x-ray detector, comprising the steps of:
   (a) reading out from the x-ray detector a frame of data representative of the entirety of the data contained therein; and
   (b) determining, for the frame of data read out in step (a), whether the x-ray detector was exposed to x-rays in that frame of data by comparing the data contained in the frame read out in step (a) with a reference frame of data corresponding to non-exposure to x-rays.

3. A method according to claim 2, further comprising initializing the detector, wherein the reference frame of data corresponds to a state of the detector immediately after initialization of the detector.

4. A method according to claim 2, further comprising:
   (c) discarding the frame of data read out in step (a) and returning to step (a) if the frame of data read out in step (a) is determined to be substantially the same as the reference frame of data; and
   (d) storing the frame of data read out in step (a) if the frame of data read out in step (a) is determined not to be substantially the same as the reference frame of data.

5. A method according to claim 4, further comprising:
   (e) reading out a next frame of data from the x-ray detector;
   (f) storing the frame of data read out in step (e);
   (g) reading out a next frame of data from the x-ray detector; and
   (h) storing the frame of data read out in step (g).

6. A method according to claim 5, further comprising:
   (i) subtracting the frame of data stored in step (h) from the frame of data stored in step (d) to obtain a first corrected frame;
   (j) subtracting the frame of data stored in step (h) from the frame of data stored in step (f) to obtain a second corrected frame; and
   (k) summing the first corrected frame and the second corrected frame.

7. A method of reading out data from an x-ray detector, comprising the steps of:
   (a) reading out from the x-ray detector a frame of data representative of the entirety of the data contained therein;
   (b) determining, for the frame of data read out in step (a), whether the x-ray detector was exposed to x-rays in that frame of data by comparing the data contained in the frame read out in step (a) with a reference frame of data corresponding to non-exposure to x-rays;
   (c) discarding the frame of data read out in step (a) and returning to step (a) if the frame of data read out in step (a) is determined to be substantially the same as the reference frame of data; and
   (d) storing the frame of data read out in step (a) if the frame of data read out in step (a) is determined not to be substantially the same as the reference frame of data.

8. A method according to claim 7, further comprising, before execution of step (a), initializing the detector, wherein the reference frame of data corresponds to a state of the detector immediately after initialization of the detector.

9. A method according to claim 8, further comprising:
   (e) reading out a next frame of data from the x-ray detector;
   (f) storing the frame of data read out in step (e);
   (g) reading out a next frame of data from the x-ray detector; and
   (h) storing the frame of data read out in step (g).

10. A method according to claim 9, further comprising:
    (i) subtracting the frame of data stored in step (h) from the frame of data stored in step (d) to obtain a first corrected frame;
    (j) subtracting the frame of data stored in step (h) from the frame of data stored in step (f) to obtain a second corrected frame; and
    (k) summing the first corrected frame and the second corrected frame.

* * * * *